United States Patent
Ratte et al.

(10) Patent No.: US 6,902,095 B2
(45) Date of Patent: Jun. 7, 2005

(54) TWO PART COLD FORMED BATTERY TERMINAL

(75) Inventors: Robert W. Ratte, North Oaks, MN (US); Norman E. Peterson, Wyoming, MN (US)

(73) Assignee: Water Gremlin Company, White Bear Lake, MN (US)

( * ) Notice: Subject to any disclaimer, the term of this patent is extended or adjusted under 35 U.S.C. 154(b) by 173 days.

(21) Appl. No.: 10/613,781

(22) Filed: Jul. 3, 2003

(65) Prior Publication Data

US 2005/0000090 A1 Jan. 6, 2005

(51) Int. Cl.$^7$ .............................................. B23K 20/02
(52) U.S. Cl. ..................................... 228/115; 228/173.3
(58) Field of Search .................... 29/882, 877, 730; 429/178, 181, 182; 72/68, 115, 125; 228/115, 171, 173.3, 173.4, 173.5, 174, 901

(56) References Cited

U.S. PATENT DOCUMENTS

| | | | | |
|---|---|---|---|---|
| 4,945,749 A | * | 8/1990 | Walker et al. | 72/356 |
| 5,077,892 A | * | 1/1992 | Nugent | 29/874 |
| 5,373,720 A | * | 12/1994 | Ratte et al. | 72/354.8 |
| 5,422,202 A | * | 6/1995 | Spiegelberg et al. | 429/179 |
| 5,632,173 A | * | 5/1997 | Spiegelberg et al. | 72/68 |
| 6,613,163 B1 | * | 9/2003 | Pfeifenbring et al. | 148/518 |

* cited by examiner

*Primary Examiner*—Jonathan Johnson
(74) *Attorney, Agent, or Firm*—Jacobson & Johnson

(57) ABSTRACT

A method of cold forming a two-part battery terminal and a two-part cold formed battery terminal comprising a cold formed lead or lead alloy slug having a male fastener protruding from a one side of the cold formed slug with a head portion of the fastener rotationally retained and embedded in the battery terminal by cold formed lead or lead alloy.

9 Claims, 2 Drawing Sheets

TWO PART COLD FORMED BATTERY TERMINAL

FIELD OF THE INVENTION

This invention relates to cold forming battery parts and, more specifically, to cold forming of a battery part around a portion of a rigid male fastener to produce a cold formed two-part battery terminal.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of cold forming battery parts and particularly cold forming battery terminals is known in the art. My U.S. Pat. No. 5,349,840 discloses a method of cold forming one type of a high torque battery terminal having a central opening through the use of a punch. U.S. Pat. No. 5,589,294 shows the cold forming of another type of battery terminal where a stainless steel nut is encapsulated by cold forming to form a side wall battery terminal.

Another type of battery terminal is the terminal that has a male threaded section of a harder material extending outward of the battery terminal. Conventionally, such terminals are made through a process of die casting where the head of a bolt is encapsulated by pouring lead around the head of the bolt. The present invention provides a method of cold forming a battery terminal with a portion of the shank of the fastener protruding therefrom and at the same time forming an acid proof seal around the back side of the bolt head.

SUMMARY OF THE INVENTION

A method of cold forming a two-part battery terminal and a two-part cold formed battery terminal comprising a cold formed lead or lead alloy slug having a male fastener protruding from one side of the cold formed slug with a head portion of the fastener rotationally retained and embedded in the battery terminal by cold formed lead or lead alloy around the end face of the fastener.

DESCRIPTION OF THE PREFERRED EMBODIMENT

Figure 1:
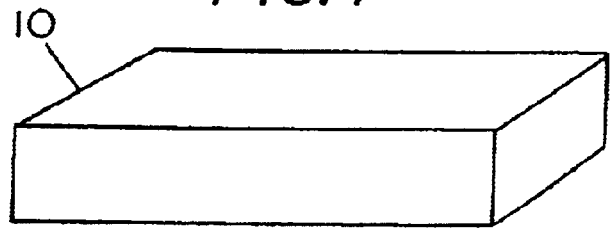
FIG. 1 is a perspective view of a slug of material for cold forming a battery part therefrom.

FIG. 1 is a perspective view of a rectangular shaped cold formable slug 10 that is to be cold formed into an offset battery terminal with the slug 10 comprising a single elongated piece of cold formable metal which is suitable for battery terminals such as lead or a lead alloy.

Figure 2:
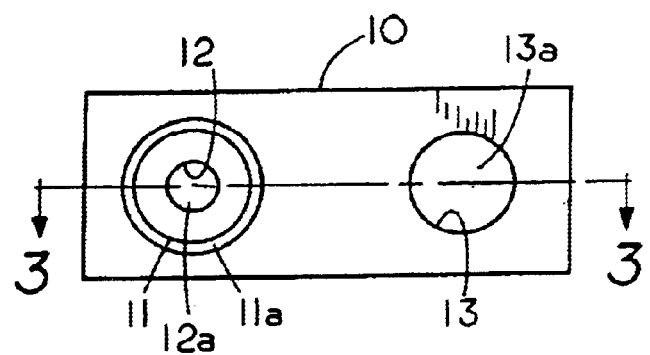
FIG. 2 is a top view of a partial formed battery terminal in a condition to receive a male fastener thereon.

FIG. 2 shows a top view of the slug 10 after a partial cold forming process with the cold forming process producing a top face extension or circular boss 11 with a first open cold formed chamber 12a defined by a cylindrical sidewall 12 on one end of slug 10. Located on the opposite end of slug 10 is a second open end cold formed chamber 13a defined by a second cylindrical side wall 13.

Figure 3:
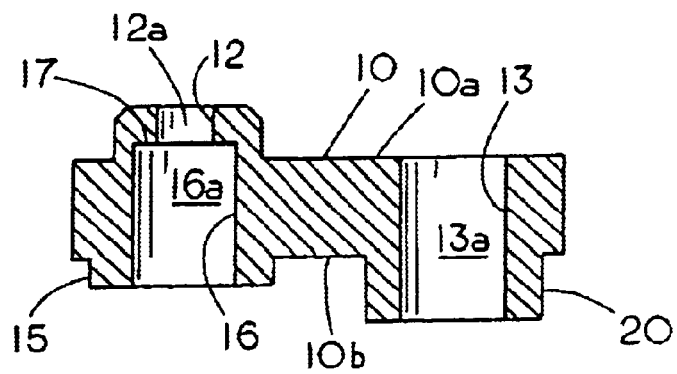
FIG. 3 is a sectional view taken along lines 3—3 of FIG. 2.

FIG. 2 shows chamber 12a provides an opening into the top face 10a of lead slug 10 and FIG. 3 shows chamber 16a provides an opening into the bottom face 10b of lead slug 10. The opposite end of slug 10 provides a terminal portion for securing the cold formed battery terminal to a battery plate or internal connector within a battery. In the preferred embodiment the internal battery connector comprises an annular extension with cold formed chamber 13a therein which can be filed with molten lead to complete the connection to the interior of the battery.

FIG. 3 shows a cross-sectional view taken along lines 3—3 to reveal the stepped coaxial cold formed chambers 12a and 16a on the interior of the partially cold formed battery terminal. FIG. 3 shows that one end of the slug 10 includes a cylindrical cold formed chamber 12a with a first opening, with chamber 12a defined by sidewall 12 and a second coaxial cold formed chamber with an opening 16a, with chamber 16a defined by cylindrical sidewall 16. An annular shoulder 17 extends transversely to an axis 19 to provide a lateral fastener stop to axially retain the head of a male fastener in slug 10. In the embodiment shown, the slug 10 has been cold formed to create an upper face annular extension 11 around opening 12a and an opposite or lower face fill-in annular extension 15 around the opening 16a in lead slug 10. The fill-in annular extension 15 comprises a reservoir of deformable metal that is proximate the opening into chamber 16a, to enable the cold formed ring 15 to fill in at least a portion of the chamber 16a through a process of cold forming. The use of a fill in extension depends on how much lead must be flowed into the chamber to seal the chamber. In some applications a fill in extension may not be needed.

In the process of cold forming the two-part battery terminal the cold formed chambers can be provided with sufficient clearance to allow hand insertion of the fastener and the fastener shank 23 into the cold formed chambers and the cold formed openings.

In the embodiment shown, an annular extension 20 has been cold formed on the opposite end of slug 10 around opening into a cylindrical chamber 13a. The process of forming internal chambers with external openings in lead slugs through the process of cold forming is known in the art and is described in more detail in my U.S. Pat. No. 5,349,840, which is hereby incorporated by reference.

FIG. 3 illustrates a partially cold formed lead terminal 10. The partially cold formed battery terminal 10 can either be further cold formed or can set aside as a component for use with different fasteners. That is, the battery terminal 10 of FIG. 3 is in a condition where it can be used in different applications that require different types or sizes of male fasteners. Thus, the partially cold formed battery terminal shown in FIG. 3 becomes a component part for a variety of different battery terminals.

Figure 4:
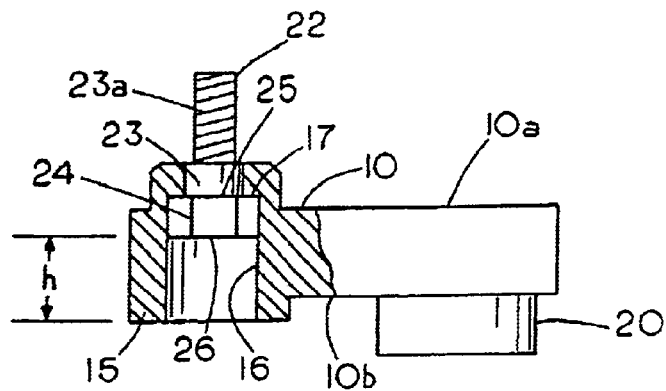
FIG. 4 is the sectional view of the partially formed battery terminal of FIG. 3 with a male fastener positioned in an opening in the battery terminal.

In order to illustrate how a male fastener is secured to the lug 10 reference should be made to FIG. 4. FIG. 4 shows that male fastener 22, which has a shank having a non-threaded portion 23 and a threaded portion 23a has been axially inserted into chamber 16a with the threaded shank 23a of the male fastener 22 extending outward for securement of a female fastener thereto. The hex shaped fastener head 24, which has hex shaped protrusions or ears to prevent rotation of fastener 22 in lug 10, has been positioned in cold formed chamber 16 with an annular shoulder 25 on fastener head 24 abutting against shoulder 17 in terminal 10 and the face end 26 on fastener head located a distance "h" below the end surface 15a of terminal 10. FIG. 4 shows that end face 26 is positioned beyond a plane extending through a terminal end face 10b.

Typically, the male fastener 22, which is made of a harder material than lead and which can be usable with the present invention is a rigid metal stud bolt that has a hex or square head with a shank having a set of external threads thereon. The purpose of having a harder metal fastener insert is to provide for tightly securing a connector since lead or lead alloys are generally to soft to support a threaded connection other than a compression connection.

Figure 5:
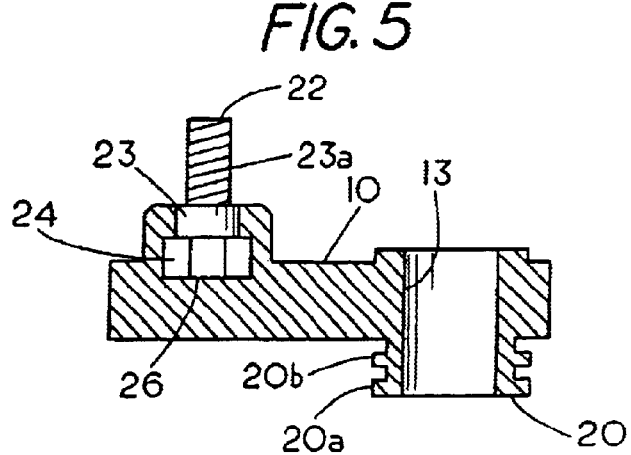
FIG. 5 is a cross-sectional view of the partially formed battery terminal of FIG. 4 with the head of a threaded male fastener and a portion of the shank of the threaded male fastener embedded in the battery terminal.

FIG. 5 illustrates the next step in the process of cold forming the two-part battery terminal. In this step, the annular ring of fill-in lead 16 is cold formed along with the rest of lug 10 to fill the chamber 16a thus embedding the head 24 of the male fastener entirely within the battery terminal by bring the material into contact with fastener end face 26. In this step one can also form acid rings 20a and 20b on the extension 20 to complete the battery terminal. This process brings the lead and lead alloy surrounding the fastener head 25 and shank 23 into tight contact with the fastener to hold the fastener in a secure condition in the battery terminal.

Figure 6:
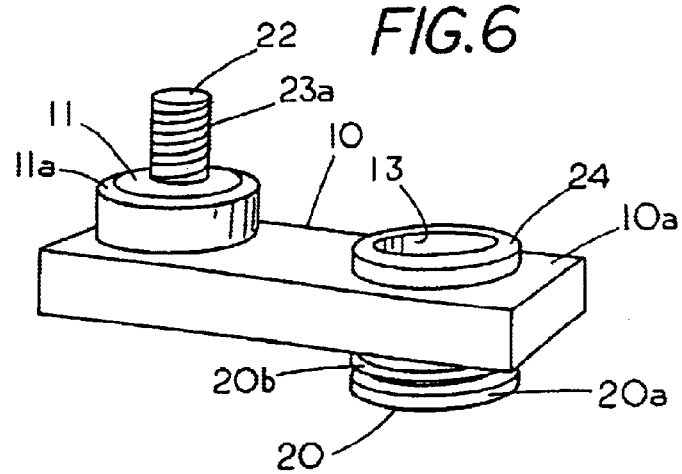
FIG. 6 is a perspective view of the finished cold formed battery terminal with one end of the battery terminal having a shank of a male fastener extending therefrom and the other end having an extension with acid rings for attachment to the interior of a battery.

FIG. 6 is a perspective view of the finished two-part battery terminal comprising a single piece of deformable metal such as a lead slug 10 that has been cold formed into an offset battery terminal at least partially around a male fastener 22 while the male fastener extends outward from a top face of the battery terminal. The finished two-part battery terminal also incudes an offset extension 20 with a set of acid rings 20a and 20b with the offset extension extending from the opposite face 10b of the battery terminal.

Thus the present process comprises a method of cold forming a slug to form a shoulder chamber in the slug. Once the shouldered chamber is formed in the slug the cold forming process of the battery terminal is interrupted and a fastener is inserted into the shouldered chamber until a shank portion of the fastener extends outward of the battery terminal. The cold forming is then continued by cold forming the material to fill in the portions of the shoulder chamber that does not contain the fastener head. Thus, one can though a backside or end face cold form the lead or lead alloy around the head 25 of the fastener 22 to form a liquid tight seal around the embedded head 25 of the fastener 22.

We claim:

1. A method of cold forming a finished battery terminal of two different materials comprising:

cold forming a lead or lead alloy slug to form a stop and a chamber with a chamber opening therein;

inserting a male fastener having a head and a shank in the chamber of the slug of material until the shank extends out of the chamber opening in the slug and the head of the fastener is in retained engagement with the shoulder; and cold forming the slug with the fastener head therein until the fastener head is embedded in the slug of material.

2. The method of claim 1 including the step of cold forming an annular fill-in lip around the chamber opening.

3. The method of claim 2 including the step of cold forming the annular lip radially and laterally into the chamber to encapsulate the fastener head therein.

4. The method of claim 1 including the step of inserting the fastener into the chamber until a fastener end face is beyond a plane extending through an exterior surface of the battery terminal.

5. The method of claim 4 including the step of forming a further chamber with an annular extension extending around an opening into the further chamber.

6. The method of claim 5 including the step of forming a set of concentric acid rings in the annular extension around the offset opening.

7. The method of claim 1 including the step of cold forming an extension for carrying a portion of the chamber and the opening on a top face of the battery terminal and for cold forming an extension for carrying acid rings on a bottom face of the slug.

8. The method of claim 1 wherein the step of placing a male fastener in the opening comprises placing a non-lead or non-lead alloyed metal bolt in the battery terminal.

9. The method of claim 1 including the step of inserting the male fastener comprises placing the male fastener with a protrusion thereon and cold forming the lead or lead slug alloy until the cold formed lead engages the protrusion to prevent rotation of the metal fastener as the metal fastener is secured to an external female connector.

* * * * *

Adverse Decision in Interference

Patent No. 6,902,095, Robert W. Ratte and Norman E. Peterson TWO PART COLD FORMED BATTERY TERMINAL, Interference No. 105,659, final judgment adverse to the patentees rendered May 21, 2009, as to claims 1-9.

(*Official Gazette*, September 29, 2009)